(12) United States Patent
Ruppert et al.

(10) Patent No.: US 12,316,183 B2
(45) Date of Patent: May 27, 2025

(54) ELECTRIC MACHINE

(71) Applicant: Schaeffler Technologies AG & Co. KG, Herzogenaurach (DE)

(72) Inventors: Andreas Ruppert, Bühlertal (DE); Robin Babian, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 470 days.

(21) Appl. No.: 17/633,241

(22) PCT Filed: Jul. 2, 2020

(86) PCT No.: PCT/DE2020/100580
§ 371 (c)(1),
(2) Date: Feb. 7, 2022

(87) PCT Pub. No.: WO2021/023332
PCT Pub. Date: Feb. 11, 2021

(65) Prior Publication Data
US 2022/0360131 A1 Nov. 10, 2022

(30) Foreign Application Priority Data
Aug. 6, 2019 (DE) .......................... 102019121186.7

(51) Int. Cl.
*H02K 3/50* (2006.01)
(52) U.S. Cl.
CPC .......... *H02K 3/50* (2013.01); *H02K 2203/09* (2013.01)

(58) Field of Classification Search
CPC ... H02K 3/50; H02K 15/0068; H02K 2203/09
See application file for complete search history.

(56) References Cited

U.S. PATENT DOCUMENTS

| | | |
|---|---|---|
| 2009/0309452 A1 | 12/2009 | Tao et al. |
| 2012/0313460 A1 | 12/2012 | Alexander et al. |
| 2014/0232215 A1* | 8/2014 | Takasaki ............ H02K 11/0094 310/43 |
| 2016/0111929 A1* | 4/2016 | Kessler .................. H02K 3/522 310/71 |
| 2018/0109158 A1 | 4/2018 | Bitzer |
| 2018/0241272 A1 | 8/2018 | Asahi et al. |
| 2018/0241277 A1 | 8/2018 | Du et al. |
| 2018/0278113 A1 | 9/2018 | Asahi et al. |
| 2022/0263370 A1* | 8/2022 | Ruppert ................... H02K 3/50 |

FOREIGN PATENT DOCUMENTS

| | | |
|---|---|---|
| CN | 102820724 B | 11/2016 |
| CN | 107925296 A | 4/2018 |
| CN | 105308833 B | 1/2019 |

(Continued)

*Primary Examiner* — Jeremy A Luks
(74) *Attorney, Agent, or Firm* — Volpe Koenig

(57) ABSTRACT

An electric machine including a stator (2) with a winding (3) having a plurality of conductors (4) associated with one or more phases and interconnected with each other, the ends (6) of at least two conductors (4) are associated with a phase projecting axially or radially from the winding (3) at the inner circumference and/or the outer circumference of the winding (3) and a connected to a power connection (9) that is mounted radially outside the winding (3) by a common connecting conductor (12a).

12 Claims, 4 Drawing Sheets

(56) References Cited

FOREIGN PATENT DOCUMENTS

| | | | |
|---|---|---|---|
| CN | 106059152 B | 9/2019 | |
| CN | 107112845 B | 9/2019 | |
| CN | 104253510 B | 10/2019 | |
| CN | 108282045 B | 1/2020 | |
| CN | 108631479 B | 5/2020 | |
| CN | 110011454 B | 2/2021 | |
| DE | 102013211968 | 1/2015 | |
| DE | 102014214066 A1 | 1/2016 | |
| DE | 102015200095 A1 | 7/2016 | |
| DE | 102015209041 A1 | 11/2016 | |
| DE | 102016222611 A1 | 5/2018 | |
| DE | 102017209931 A1 | 12/2018 | |
| EP | 2747250 A2 * | 6/2014 | ............... H02K 3/50 |
| EP | 3082228 | 10/2016 | |

* cited by examiner

ELECTRIC MACHINE

CROSS-REFERENCE TO RELATED APPLICATIONS

This application is the U.S. National Phase of PCT Appln. No. PCT/DE2020/100580, filed Jul. 2, 2020, which claims priority from German Patent Application No. 10 2019 121 186.7, filed Aug. 6, 2019, the entire disclosures of which are incorporated by reference herein.

TECHNICAL FIELD

The disclosure relates to an electric machine, comprising a stator having a winding comprising a plurality of conductors associated with one or more phases and interconnected with each other.

BACKGROUND

Electric machines comprising a rotor and a stator are used in various areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are associated with one or usually more phases.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial planes, wherein the conductors move from plane to plane, so to speak. To form these meandering, circumferential conductors, they are to be connected accordingly at the ends thereof, which is usually done by welding the conductor ends that are adjacent to one another. The conductor ends converge at one point or on one winding side in the form of what is termed the star, where they are connected to one another. In this area, the connection of the individual phases must be made to an external power supply, i.e., a power connection, which is used to generate the magnetic field, which is often very difficult to implement for reasons of installation space.

SUMMARY

The disclosure is based on the problem of specifying an electric machine that is comparatively improved.

To solve this problem, in an electric machine of the type mentioned, the disclosure provides that the ends of at least two conductors assigned to a phase project axially or radially over the winding on the inner circumference and/or on the outer circumference of the winding and having a power connection arranged radially outside the winding are connected via a common connecting conductor.

According to the disclosure, it is provided that the actual conductor interconnection, i.e., the connection of the individual conductors to form the corresponding phase-specific meander structures, and the interconnection for coupling with the power supply are to be separated via a high-voltage terminal, or power connection. An interconnection ring is used for the actual conductor connection, i.e., a conductor ring that is axially attached to the winding. This engages in the area of the conductor ends that extend out, the conductor ends being able to project axially on the inner circumference and/or on the outer circumference of the winding. The conductor ends are associated with the individual conductor sections, unless they are connected to one another on other, for example further inward, radial planes. The conductor ends are connected to the interconnection ring, usually welded to it accordingly, so that the corresponding phase-specific conductor structures or conductor connections are generated via the interconnection ring.

To connect the winding to the actual current connection, i.e., the high-voltage terminal, corresponding connecting conductors are provided according to the disclosure, which in a phase-specific manner connect the conductor ends projecting axially over the winding to the corresponding phase-specific contact areas of the power connection or HV terminal. These connecting conductors have a certain length after the power connection and thus the corresponding contact areas on the one side and the projecting ends of the stator on the other side are spaced apart from one another due to the separation of the interconnection ring and the power connection.

Since more than two conductor ends are often assigned to a phase, a large number of separate conductors would need to be laid when using individual connecting conductors, but the individual conductors always connect the corresponding conductor ends of the same phase. To simplify this, it is provided according to the disclosure that at least two conductor ends of conductors assigned to a common phase are connected to the power connection via a common connecting conductor. This means that one connecting conductor makes contact with two or more in-phase conductor ends on the winding side and runs as a common conductor to the one power connection-side connection terminal. Thus, only one conductor must be laid, which makes it possible to contact several ends of the conductor on the winding side at the same time. This avoids the complex laying and integration of a large number of parallel conductors, and consequently also the effort for contacting, as additionally the compactness of the electric machine is improved as a result.

If the common connecting conductor is used to contact two in-phase conductor ends and to connect them to a terminal-side connection, the cross-section of the connecting conductor should be at least twice that of the corresponding individual conductors that have been used up to now or that of the winding conductors, so that there can be no jump in the conductor cross-section at the transition from the conductor ends or the winding to the connecting conductors. If three in-phase conductor ends are connected, the conductor cross-section of the common connecting conductor should be at least three times as large, etc. This means that the conductor cross-section of the connecting conductor corresponds to at least the cross-section sum of the winding-side conductors or conductor ends to be contacted, and is possibly slightly larger.

Concerning the configuration of such a connecting conductor with regard to the contacting of the conductor ends, different variants are conceivable. According to a first alternative of the disclosure, the connecting conductor can have a contact section with which it is only contacted on one side of the two conductor ends. The connecting conductor therefore rests with the contact section thereof on only one side, for example radially on the outside, on the corresponding contact sections, or on the contact surfaces of the conductor ends. As an alternative thereto, the connecting conductor can also have a contact section with which it is contacted on two opposite sides at both conductor ends. This means that there is double-sided contact at the conductor ends, as a result of which the contact connection is even more secure and, if necessary, also improved with regard to the current-carrying capacity. Independently of this, the connection of the conductor ends and the connecting conductor is of course preferably carried out by welding.

In the event that a conductor contact is provided on both opposite sides of the conductor ends, in a further development of the disclosure the connecting conductor can have a contact section which is U-shaped for contact on both sides of the conductor ends. The contact section is thus designed in the manner of a clamp and, due to the U-shape thereof, encompasses the two or more conductor ends, so these are received in the U-shaped receptacle and can be correspondingly welded therein.

With regard to such a contact section geometry with a U-shape, two alternatives are conceivable. According to a first alternative, the contact section can overall have a U-shaped receptacle which encompasses both or more ends. It is therefore designed as a U-shaped bracket at the end of the connecting conductor, into which the conductor ends engage.

As an alternative thereto, it is possible for the contact section to have two U-shaped receptacles, each of which encompasses one end of the conductor. So here each end of the conductor is fixed in a common U-shaped bracket. The contact section can be made wider than the actual conductor width, wherein the specific geometry ultimately depends on the distance between the two or more conductor ends to be contacted, which are usually more closely spaced and offset from one another only a short distance around the circumference of the winding.

Furthermore, several contact elements corresponding to the number of phases can be provided at the power connection, which contact elements have a broad base and at least two fingers protruding therefrom. Such a contact element offers the possibility of both connecting a common, wide connecting conductor and, in the event that such a common, wide connecting conductor cannot be used, of connecting correspondingly narrower, individual connecting conductors. The contact element is practically multifunctional. In the area of the wide base, the wide, common connecting conductor can be connected. In the area of the narrower, protruding fingers, there is a narrow connecting conductor in each case, so that regardless of the type or geometry of the connecting conductors, a suitable connection can always be achieved with such a contact element.

As already described, the ends of at least some of the conductors preferably project beyond the winding, wherein some of these conductor ends are connected to an interconnection ring placed axially on the winding, wherein the connecting conductors are fixed to at least one holding element provided on the interconnection ring. This configuration with the common interconnection ring enables a simple design of the meander structure of the conductors over the winding itself. In addition, the interconnection ring also serves as a location for fixing the connecting conductors. These connecting conductors have a certain length after the power connection and thus the corresponding contact areas on the one side and the projecting ends of the stator on the other side are spaced apart from one another due to the separation of the interconnection ring and the power connection. To prevent these connecting conductors, which can be rectangular or round in cross-section, from oscillating or vibrating during operation, due to any vibrations in the drive train, the disclosure provides that the connecting conductors are fixed to at least one holding element provided on the interconnection ring. This means that the connecting conductors are not only connected to the conductor ends on the one hand and the contact areas on the other hand via the actual contact points thereof, i.e., welded connections, but are also fixed along the length thereof to at least one holding element provided on the interconnection ring. This enables a sufficiently rigid connection of the connecting conductors to or within the machine; on the other hand, the conductor configuration is still flexible enough to be able to compensate for any vibrations in the drive train.

The interconnection ring can have a housing on which the holding element or elements are arranged. As described, the interconnection ring comprises corresponding separate conductor bridges. These are preferably accommodated in a housing, preferably made of plastic, so that the interconnection ring can also be preconfigured and only needs to be put on. The conductor bridges, which are correspondingly stable metal sheets, are geometrically shaped in such a way that they reach the conductor ends to be connected accordingly. They are grouped to the corresponding circuit ring and allow easy bridging of corresponding distances both in the circumferential and in the radial direction. These conductor bridges, like the individual conductors and connecting conductors, are of course isolated from one another. They have corresponding, preferably radially salient connection sections to which the ends of the conductors extending out from the winding are welded. These preferably protrude from the housing and enable simple conductor connection.

Since, depending on the position of the phase-specific ends of the individual conductors, the connecting conductors can have a considerable length and, for example, run around a circumference of up to 90°, the connecting conductors differ in length, which is why some connecting conductors are only attached to a holding element, others may also be attached to two or more holding elements are fixed around the circumference.

The fixing is conveniently carried out in such a way that the or each holding element is designed as a locking or clamping element to which one or more connecting conductors are fixed via a latching or clamping connection. This enables the holding elements to be easily connected to the corresponding connecting conductors.

The housing of the interconnection ring itself is preferably designed as a plastic housing that is manufactured using a plastic injection molding process. The or each holding element or the or each latching or clamping element is preferably molded directly onto the plastic housing, that is to say is made integrally or in one piece therewith. The housing therefore has a double function, on the one hand housing the conductor bridges and on the other hand that of the support point for the connecting conductors.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
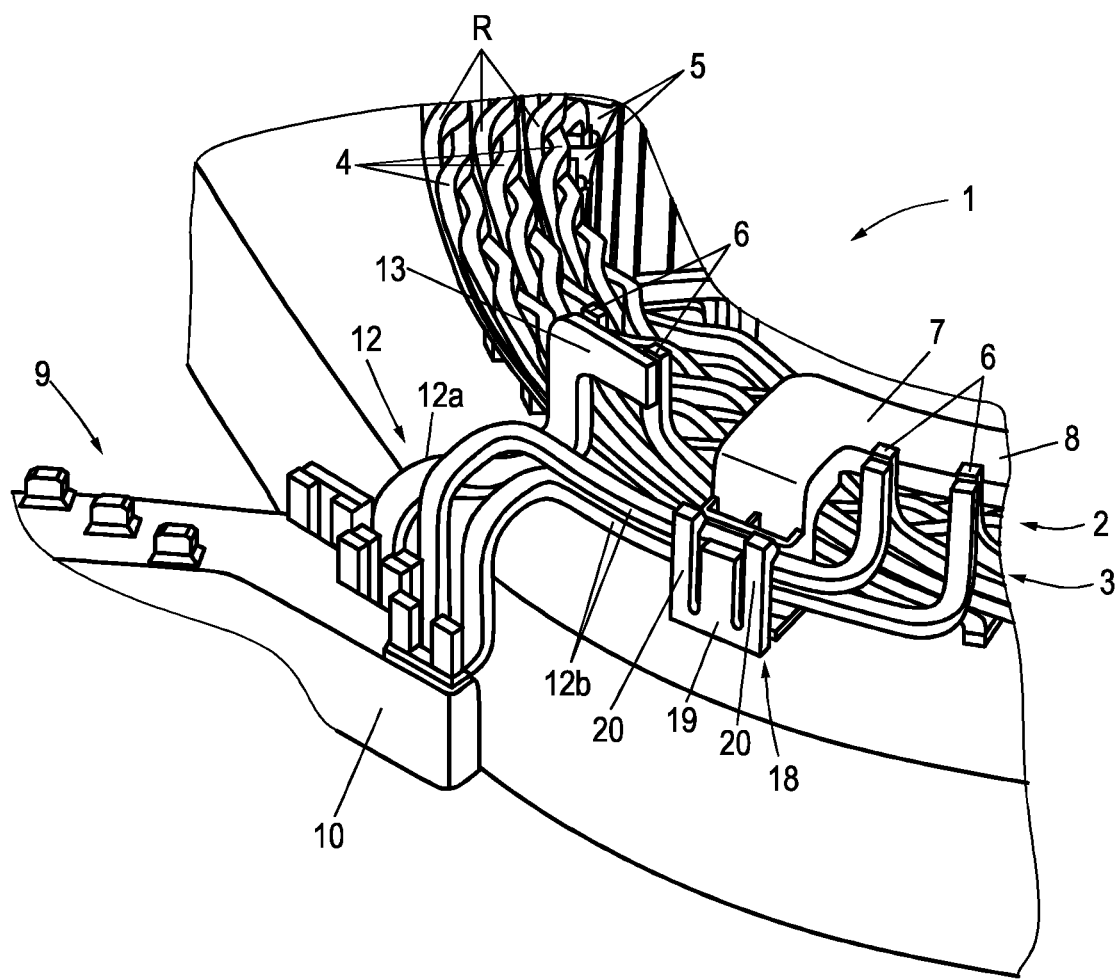
FIG. 1 shows a partial view of an electric machine according to the disclosure having a connecting conductor in a first embodiment.

FIG. 1 shows, in the form of a partial view, a schematic diagram of an electric machine 1 according to the disclosure, comprising a stator 2 having a winding 3 comprising a plurality of conductors 4, which are assigned to three separate phases in the example shown. More or fewer phases can also be provided. Each conductor 4 is designed almost like a U-shaped bracket, wherein a plurality of such U-shaped conductors, often also called hairpins, are plugged together to form the winding 3, which can also be referred to as a winding cage. The plurality of conductors 4 define different radial planes R, as shown in FIG. 1. For this purpose, depending on the winding diagram, the conductors 4 extend from one radial plane to another radial plane, for example an adjacent radial plane, in the region in which they are connected to the conductor ends of corresponding adjacent conductors continuing the phase conductor.

The conductors 4 are guided or bent and laid in such a way that corresponding recesses result, which extend radially so that corresponding stator teeth 5 engage in these recesses or the corresponding conductors 4 are wound between the corresponding grooves of the stator teeth 5. The basic structure of such a stator or such an electric machine, and such a winding 3 wound from the separate brackets described is basically known.

In the stator 2 according to the disclosure, the ends 6 of the conductors 4, insofar as the ends 6 terminate respectively at the inner circumference and/or the outer circumference of the annular winding 3, are axially salient, i.e., they stick out axially from the winding 3. These ends 6 are associated with individual conductors 4, which in turn are associated with different phases, which is why the conductor ends 6 must be connected according to the routing diagram for the conductor 4. For this purpose, an interconnection ring 7 is used, which is placed axially on the end face of the winding 3 and is arranged between the conductor ends 6 or engages therebetween. The interconnection ring 7 comprises a number of corresponding conductor bridges and connection sections, not shown in more detail, which project to the side from the housing 8 and are positioned precisely adjacent to the corresponding conductor end 6 after the interconnection ring 7 has been inserted between the conductor ends 6 with which they are to be connected. The connection is made, e.g., by simple welding so that when they are connected, all conductors 4 are interconnected correctly and in a phase-specific manner. Other connection methods are also conceivable.

Furthermore, a power supply 9 is provided, which is arranged to be radially adjacent to the winding 3 in the region of the axial end thereof, i.e., of the winding head. This power connection 9, also referred to as an HV terminal, comprises a housing 10, in which corresponding busbars are arranged, which protrude with their contact elements 11, i.e., connection terminals (see FIG. 5) thereof protrude from the housing 10.

To connect these contact elements 11 to the corresponding, phase-specific conductor ends 6, connecting conductors 12 are provided, wherein FIG. 1 shows on the one hand a connecting conductor 12a according to the disclosure, which serves to connect two conductor ends 6 assigned to the same phase with a contact element 11, and two separate, individual connecting conductors 12b which each connect a conductor end 6 to a common contact element 11 as before.

The connecting conductor 12 has a laterally or circumferentially widened contact section 13 which, coming from the radially outer side, lies against the two conductor ends 6 to which it is to be welded. It therefore contacts two conductor ends 6 at the same time. The conductor width thereof or the conductor cross-section thereof corresponds to at least twice a conductor width or a conductor cross-section of the conductor 4 or the conductor ends 6. It then runs from the contact point to the conductor ends 6, then to a contact element 11 on the power connection 9, where it also lies flat and is welded thereonto.

As FIG. 1 clearly shows, with a wide connecting conductor 12a according to the disclosure, the simultaneous contacting of two (or more) conductor ends 6 and the connection thereof to a common contact element 11 is possible, while likewise, as also shown in FIG. 1, instead of such a wide connecting conductor 12a, narrow connecting conductors 12b would each need to be contacted with a conductor end 6. The assembly and laying effort is significantly reduced, as is the number of components to be used.

Figure 2:
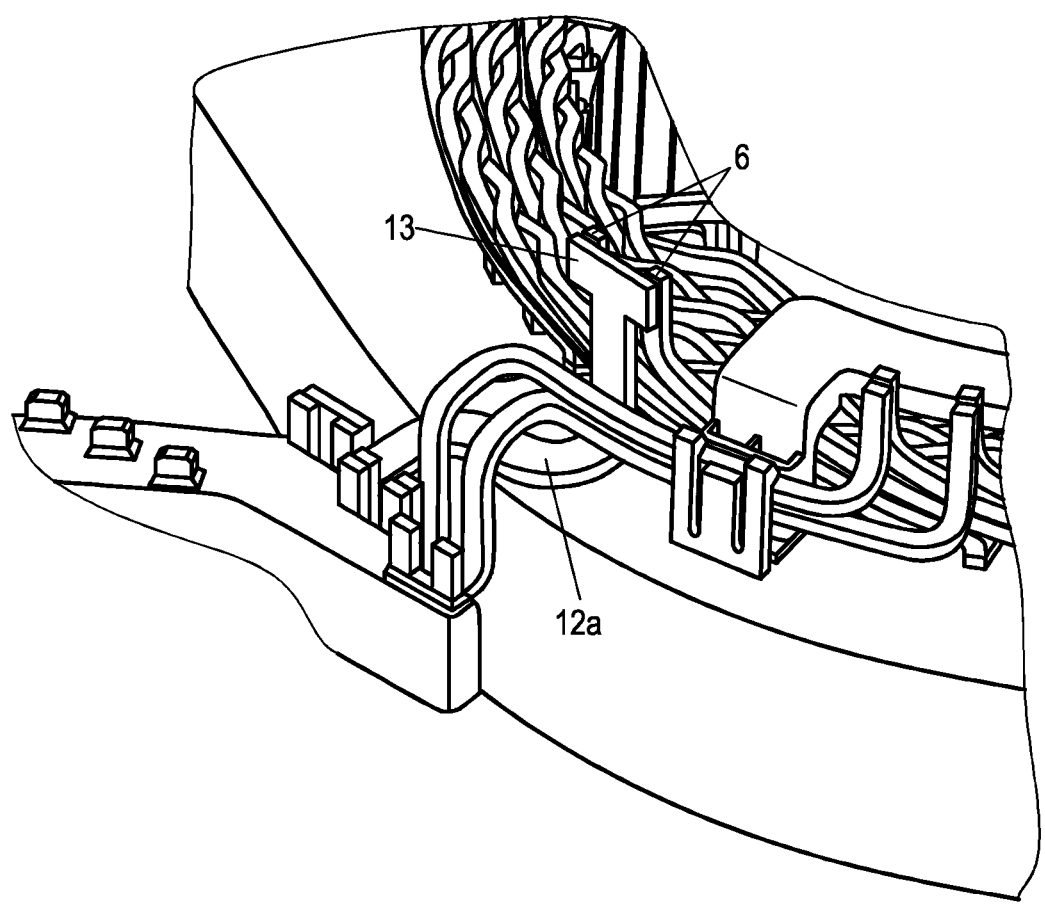
FIG. 2 shows a view corresponding to FIG. 1 having a connecting conductor of a second embodiment.

While in the embodiment according to FIG. 1 the contact section 13 is positioned in a quasi L-shape relative to the connecting conductor 12a, FIG. 2 shows a T-shape of the contact section 13 or the connecting conductor 12a in the connection area to the two conductor ends 6. Here, too, there is a radially outer contact between the contact section 13 and the conductor ends 6.

Figure 3:
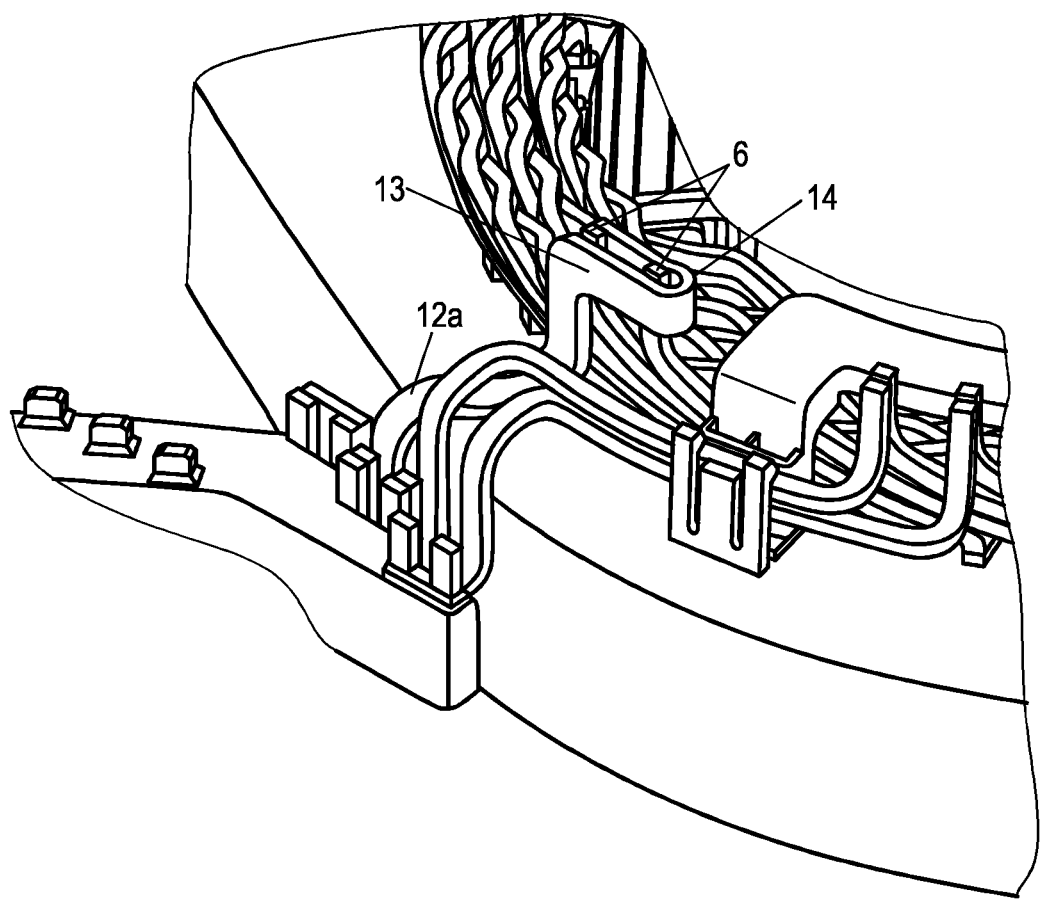
FIG. 3 shows a further partial view having a connecting conductor of a third embodiment.

As an alternative thereto, FIG. 3 shows an embodiment in which the contact section 13 of the wide connecting conductor 12a according to the disclosure is designed as a U-shaped bracket 14, which can be seen to encompass the two (or more) conductor ends 6, which are consequently in contact and connected with the contact section 13 on both sides. This ensures an even more secure connection with an even higher current-carrying capacity.

Figure 4:
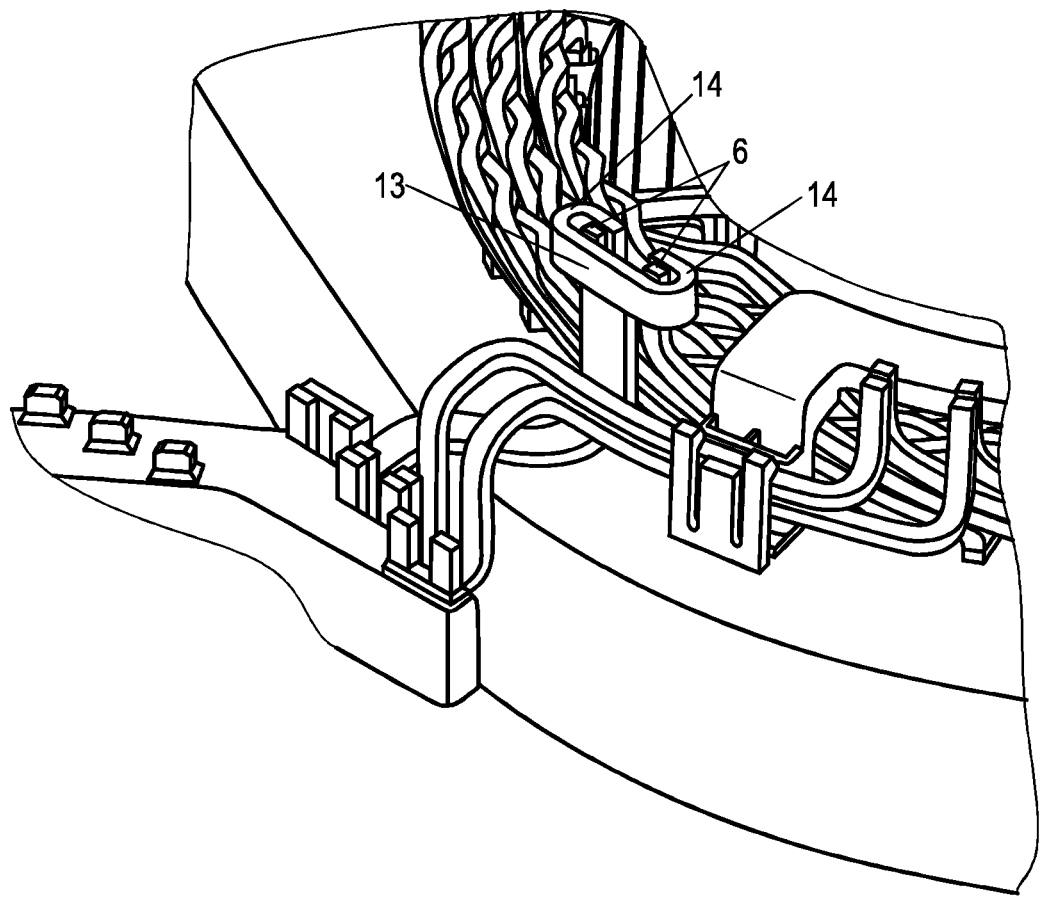
FIG. 4 shows a partial view having a connecting conductor of a fourth embodiment.

While the contact section 13 has only one U-shaped bracket in the embodiment according to FIG. 3, FIG. 4 shows an embodiment in which the contact section 13 has two U-shaped brackets 14, each of which encompasses a conductor end 6 and also rests on both sides thereof. Here, too, as in all other configurations, the connection is made by welding.

The configuration according to FIG. 3 is comparable to that from FIG. 1, i.e., it also has an L-shaped side view but with a U-shaped bracket design, while the configuration according to FIG. 4 corresponds to the T-shaped arrangement from FIG. 2, although also with a U-shaped bracket design.

Figure 5:
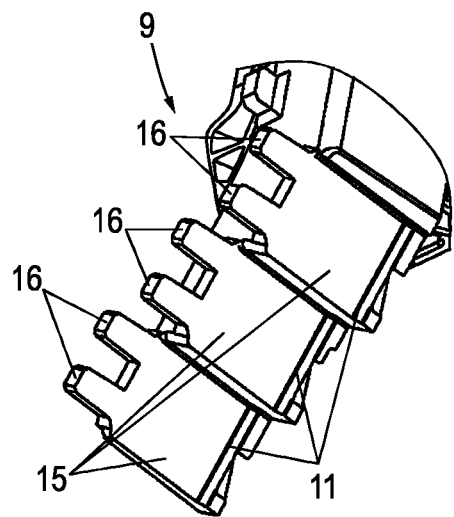
FIG. 5 shows a detailed view of the area of the contact elements of the power connection without connected connecting conductors.
Figure 6:
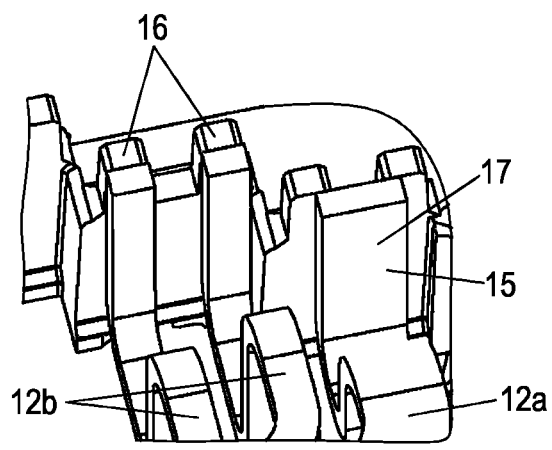
FIG. 6 shows the arrangement from FIG. 5 having connected connecting conductors.

As already described, FIG. 5 shows the three contact elements 11 of the power connection 9. Each contact element 11 is assigned to a phase and has a wide base 15 from which two fingers 16 protrude. Such a contact element 13 enables the arrangement of both a wide connecting conductor 12a according to the disclosure and individual narrow connecting conductors 12b, as shown in FIG. 6. The wide connecting conductor 12a has a wide contact area 17 corresponding to the conductor cross-section thereof, which rests on the wide base 15 over a large area. The welding takes place there.

The narrow connecting conductors 12b, on the other hand, (also) extend along the fingers 16 and are welded thereonto. This means that such a contact element 13 enables both the wide and the narrow connecting conductors to be fixed.

Returning to FIG. 1, also shown is a holding element 18 molded onto the housing 8 made of plastic, which is designed as a latching or clamping element 19 and has two latching or clamping arms 20 which are slightly resilient. In the example shown, the two connecting conductors 12b are inserted and snapped into these latching or clamping elements 19, so they are fixed there in a fixed position and pressed against the opposite leg by means of the fingers 20, so that on the one hand they are fixed, but on the other hand a sufficient mobility is still given to compensate for any vibrations. The holding element 18, of which several can be provided along the housing 8, is formed in one piece or integrally with the housing 8, that is to say also made of plastic, so that it is a multifunctional component. During assembly, only the connecting conductors need to be inserted and fixed.

Instead of the two connecting conductors 12b shown in the figures, there is of course also the option of laying a single, correspondingly wider connecting conductor 12a here as well. Such a wide connecting conductor 12a can also be fixed in the holding element 18. FIG. 1 only serves to show that, in principle, there is also the possibility, according to the disclosure, of laying wide, multiple conductor ends 6 contacting connecting conductors 12a together with conventional, narrow connecting conductors 12b. Of course, primarily or exclusively correspondingly wide connecting conductors 12a, regardless of the geometry thereof, are preferably used, particularly in the contact section 13, combined with a simplification of assembly and conductor routing, a reduction in the number of components required, and a greater compactness of the electric machine.

LIST OF REFERENCE SYMBOLS

1 Electric machine
2 Stator
3 Winding
4 Conductor
5 Stator tooth
6 End
7 Interconnection ring
8 Housing
9 Power supply
10 Housing
11 Contact element
12 Connecting conductors
12a Connecting conductor
12b Connecting conductor
13 Contact section
14 U-shaped bracket
15 Base
16 Finger
17 Contact Area
18 Holding element
19 Latching or clamping element
20 Finger
R Radial plane

The invention claimed is:

1. An electric machine, comprising:
   a stator having a winding comprising a plurality of conductors assigned to one or more phases, which are interconnected with each other; and
   ends of at least two of the conductors associated with one of the phases project axially or radially from the winding at at least one of an inner circumference or an outer circumference of the winding, and are connected to a power connection arranged radially outside the winding by a common connecting conductor;
   wherein a plurality of contact elements corresponding to a number of phases are provided on the power connection, said contact elements have a base and at least two fingers protruding therefrom and aligned with the base, the connecting conductor has a contact section with which the connecting conductor contacts on two opposite sides at both of the conductor ends, and the contact section includes two U-shaped receptacles which each encompass one of the conductor ends.

2. The electric machine according to claim 1, wherein the contact section is wider than an actual conductor width.

3. The electric machine according to claim 1, wherein the conductor ends of at least some of the conductors project beyond the winding, some of the conductor ends are connected axially to an interconnection ring set on the winding, and the connecting conductors are fixed to at least one holding element provided on the interconnection ring.

4. The electric machine according to claim 3, wherein the interconnection ring has a housing in which the one or more holding elements are arranged or formed integrally therewith.

5. The electric machine according to claim 4, wherein at least one of the holding elements is configured as a latching or clamping element, on which one or more of the connecting conductors are fixed via a latching or clamping connection.

6. An electric machine, comprising:
   a stator having a winding comprising a plurality of conductors assigned to one or more phases, which are interconnected with each other; and
   ends of at least two of the conductors associated with one of the phases project from the winding at at least one of an inner circumference or an outer circumference of the winding, and are connected to a power connection arranged outside the winding by a common connecting conductor;
   wherein the conductor ends of at least some of the conductors project beyond the winding, some of the conductor ends are connected axially to an interconnection ring set on the winding, and the connecting conductors are fixed to at least one holding element provided on the interconnection ring, and
   wherein the at least one holding element is positioned radially outside the winding, and the at least one holding element includes two latching or clamping arms configured to directly clamp onto the connecting conductors.

7. The electric machine according to claim 6, wherein the connecting conductor has a contact section with which the connecting conductor contacts on two opposite sides at both of the conductor ends.

8. The electric machine according to claim 7, wherein the connecting conductor has a contact section which is U-shaped for contact on both of the opposite sides of the conductor ends.

9. The electric machine according to claim 7, wherein the contact section has a U-shaped receptacle which encompasses both of the conductor ends.

10. The electric machine according to claim 7, wherein the contact section has two U-shaped receptacles which each encompass one of the conductor ends.

11. The electric machine according to claim 6, wherein a plurality of contact elements corresponding to a number of phases are provided on the power connection, said contact elements have a base and at least two fingers protruding therefrom.

12. The electric machine according to claim 6, wherein the interconnection ring has a housing in which the one or more holding elements are arranged or formed integrally therewith.

\* \* \* \* \*